United States Patent
Ding et al.

(10) Patent No.: US 11,520,959 B1
(45) Date of Patent: Dec. 6, 2022

(54) PRUNING OF BUFFERING CANDIDATES FOR IMPROVED EFFICIENCY OF EVALUATION

(71) Applicant: Cadence Design Systems, Inc., San Jose, CA (US)

(72) Inventors: Yi-Xiao Ding, Austin, TX (US); Zhuo Li, Austin, TX (US); Jhih-Rong Gao, Austin, TX (US); Sheng-En David Lin, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 92 days.

(21) Appl. No.: 17/219,742

(22) Filed: Mar. 31, 2021

(51) Int. Cl.
 *G06F 30/323* (2020.01)
 *G06F 9/54* (2006.01)

(52) U.S. Cl.
 CPC ............ *G06F 30/323* (2020.01); *G06F 9/544* (2013.01)

(58) Field of Classification Search
 CPC ..................................................... G06F 9/544
 USPC ........................................................ 716/103
 See application file for complete search history.

(56) References Cited

U.S. PATENT DOCUMENTS

| | | | |
|---|---|---|---|
| 8,245,167 B1 * | 8/2012 | e Silva ................ | G06F 30/3312 716/108 |
| 10,643,019 B1 * | 5/2020 | Han ...................... | G06F 30/398 |
| 10,860,757 B1 * | 12/2020 | Li ........................... | G06F 30/30 |
| 2015/0213188 A1 * | 7/2015 | Chowdhury .......... | G06F 30/398 716/114 |
| 2018/0373815 A1 * | 12/2018 | Zhou ....................... | G06F 30/39 |
| 2021/0192352 A1 * | 6/2021 | Wang ..................... | G06N 3/082 |

* cited by examiner

*Primary Examiner* — Suchin Parihar
(74) *Attorney, Agent, or Firm* — Schwegman Lundberg & Woessner, P.A.

(57) ABSTRACT

An integrated circuit (IC) design is accessed from a database in memory. The IC design comprises a route connecting a source to a sink. A set of buffering candidates for buffering are generated for the net. A timing improvement associated with a buffering candidate in the set of buffering candidates is determined using a first timing model. The buffering candidate is pruned from the set of buffering candidates based on the timing improvement and a cost associated with the buffering candidate. The pruned set of buffering candidates is evaluated using a second timing model, and a buffering solution for the net is selected from the pruned set of buffering candidates based on a result of the evaluating. The IC design is updated to include the buffering solution selected for the net.

20 Claims, 5 Drawing Sheets

US 11,520,959 B1

PRUNING OF BUFFERING CANDIDATES FOR IMPROVED EFFICIENCY OF EVALUATION

TECHNICAL FIELD

The present disclosure generally relates to the technical field of integrated circuit (IC) design. In particular, the present disclosure addresses systems and methods for performing pruning of buffering solutions for an IC design prior to evaluation and selection.

BACKGROUND

An IC comprises cells of similar and/or various sizes and connections between or among the cells. A cell comprises one or more circuit elements such as transistors, resistors, capacitors, inductors, and other basic circuit elements grouped together to perform a logic function. Each cell includes several pins interconnected by wires to pins of one or more other cells. A net includes a set of pins connected by wires in order to form connections between or among the pins. An IC design may include multiple nets. A design netlist specifies the connections between the pins.

Design engineers design ICs by transforming circuit descriptions of the ICs into geometric descriptions, called layouts. To create layouts, design engineers typically use electronic design automation (EDA) applications. These applications provide sets of computer-based tools for creating, editing, and analyzing IC design layouts.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
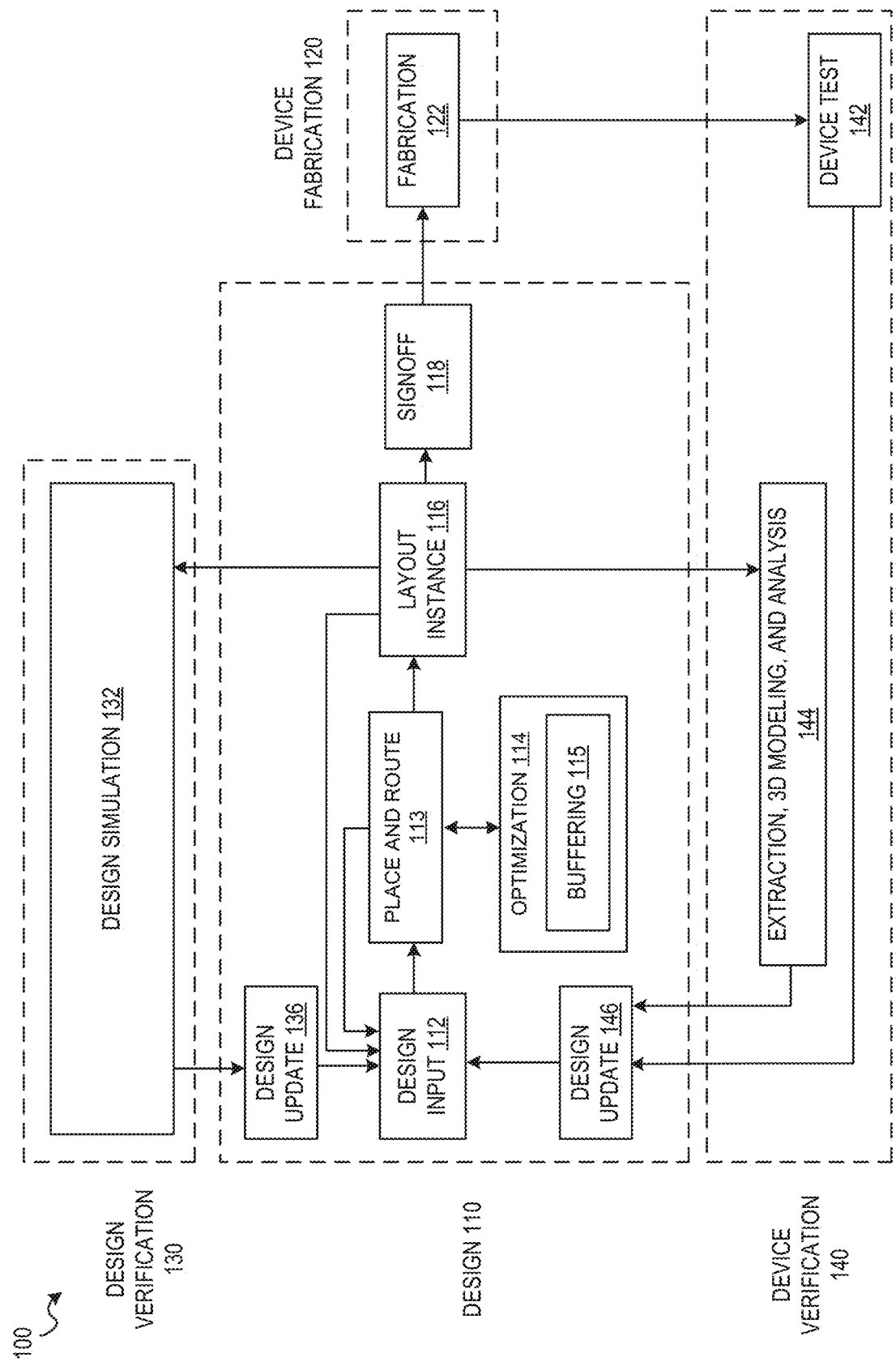
FIG. 1 is a diagram illustrating an example design process flow of an EDA system that includes buffering nets in an IC design, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

Placement and routing are key operations in the physical design cycle and are often referred to collectively as a "place and route" stage. During placement, exact locations are assigned to various components within an IC's core area. Further optimizations are often performed to fix timing and design rule violations in the design. EDA applications often include buffer insertion engines that perform buffering, which is a process in which buffers or inverters are inserted at locations within the design while optimizing circuit characteristics according to design rules. A buffering engine takes a synthesized netlist together with a technology library and produces a placement layout.

Conventional buffering techniques often include evaluating multiple candidates for buffering each net (e.g., multiple buffer trees) using a scoring algorithm such as a return on investment (ROI) algorithm that indicates a measure of improvement provided by each buffering candidate. Conventional scoring algorithms calculate a cost associated with each rebuffering based in part on timing characteristics (e.g., skew, slew, slack, etc.) and uses these costs as a basis for evaluating the improvement provided by each buffering candidate for a net relative to the unbuffered net (e.g., the net with no buffers or inverters inserted) to ultimately select a buffering solution for a net from among the many buffering candidates generated for the net. Traditional buffering optimizations produce numerous buffering candidates that require substantial processing resources to accurately evaluate their timing characteristics, which can lead to very slow run-time for such processing.

Aspects of the present disclosure address problems with slow run-time of conventional approaches to buffering in EDA, among others, with a design process that includes cost-based pruning of buffering candidates to improve the efficiency of buffering candidate evaluation. In an example, an EDA system (e.g., a computing device executing EDA software) accesses a database that includes data describing an IC design that includes a net list. Each net in the net list includes a route connecting a source and a sink.

For each net, the EDA system generates a set of buffering candidates (e.g., by inserting one or more buffer or inverter cells at bufferable locations along the route that connects the source to the sink). The EDA system determines a cost and timing improvement associated with each buffering candidate. To determine the timing improvement of a buffering candidate, the EDA system uses a first timing model that provides a quick estimate of timing characteristics of the buffering candidate. The EDA system uses a second timing model to evaluate the buffering candidate and select a buffering solution for the net. The second timing model is used to accurately determine timing characteristics associated with each buffering candidate and use the determined timing characteristics to determine a return on investment (ROI) for each buffering candidate, which is used as a basis for selecting the buffering solution from the set of buffering candidates. The EDA system updates the database in accordance with the buffering solutions selected for each net.

While the second timing model can provide more accurate results than the first timing model, the second timing model requires more computational overhead and run-time than the first timing model. As such, prior to evaluating the set of buffering candidates using the second model, the EDA system can prune one or more buffering candidates from the set of buffering candidates to reduce the computational resources needed to evaluate the set of buffering candidates, thereby improving the run-time of the evaluation process. The EDA system can prune a buffering candidate based on the cost of the buffering candidate, the timing improvement provided by the buffering candidate, or a combination of both. For example, the EDA system can perform: monotonic pruning in which a buffering candidate is pruned if there is at least one other candidate in the set with a smaller cost and greater timing improvement; convex pruning in which a buffering candidate is pruned if the candidate does not form a convex curve with a smaller-cost candidate and a larger-cost candidate; and ROI-based pruning in which a candidate is pruned if a ratio of cost to timing improvement associated with the candidate is less than a user-defined parameter that establishes a minimum ROI for buffering candidates.

FIG. 1 is a diagram illustrating an example design process flow 100 of an EDA system that includes buffering nets in an IC design, according to some embodiments. As shown, the design process flow 100 of the EDA system includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, placement, and timing analysis are performed in a place and route 113 operation, and optimization is performed in a optimization 114 operation along with any other automated design processes. While the design process flow 100 shows place and route 113 and optimization 114 occurring prior to a layout instance 116, routing, placement, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the optimization 114 operation includes a buffering 115 operation performed by the EDA system. As an example, given a net with a routing topology, several points along the routing topology of the net are selected as bufferable locations for inserting a buffer (or inverter) cell. A set of buffering candidates are generated based on the bufferable locations. For example, the EDA system may utilize one or more cell libraries that provide multiple cell types including multiple buffer and inverter cell types to generate the buffering candidates. Buffering candidates may be generated by inserting various cell types at each bufferable location. Each buffering candidate indicates a particular bufferable location along with a buffer or inverter of a particular type inserted at the bufferable location.

The EDA system determines a cost and timing improvement associated with each buffering candidate. The EDA system determines a cost associated with a given buffering candidate based on an area consumed by cells in the buffering candidate, leakage current associated with the buffer (or inverter) cells in the initial buffer tree, and a total dynamic power of the buffering candidate. The EDA system determines the timing improvement using a first timing model that provides a quick estimate of timing characteristics of the buffering candidate. The EDA system uses a second timing model to evaluate the buffering candidate and select a buffering solution for the net. The second timing model is used to accurately determine timing characteristics associated with each buffering candidate and use the determined timing characteristics to determine an ROI for each buffering candidate, which is used as a basis for selecting the buffering solution from the set of buffering candidates.

Prior to evaluating the set of buffering candidates using the second model, the EDA system prunes one or more buffering candidates from the set of buffering candidates to reduce the computational resources used in evaluating the set of buffering candidates, which speeds up the run-time of the evaluation process. The EDA system can prune a buffering candidate based on the cost of the buffering candidate, the timing improvement determined for the buffering candidate using the first timing model, or a combination of both. For example, the EDA system can perform: monotonic pruning in which a buffering candidate is pruned if there is at least one other candidate in the set with a smaller cost and greater timing improvement; convex pruning in which a buffering candidate is pruned if the candidate does not form a convex curve with a smaller-cost candidate and a larger-cost candidate; and ROI-based pruning in which a candidate is pruned if a ratio of cost to timing improvement associated with the candidate is less than a user-defined parameter that establishes a minimum ROI for buffering candidates.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

A design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
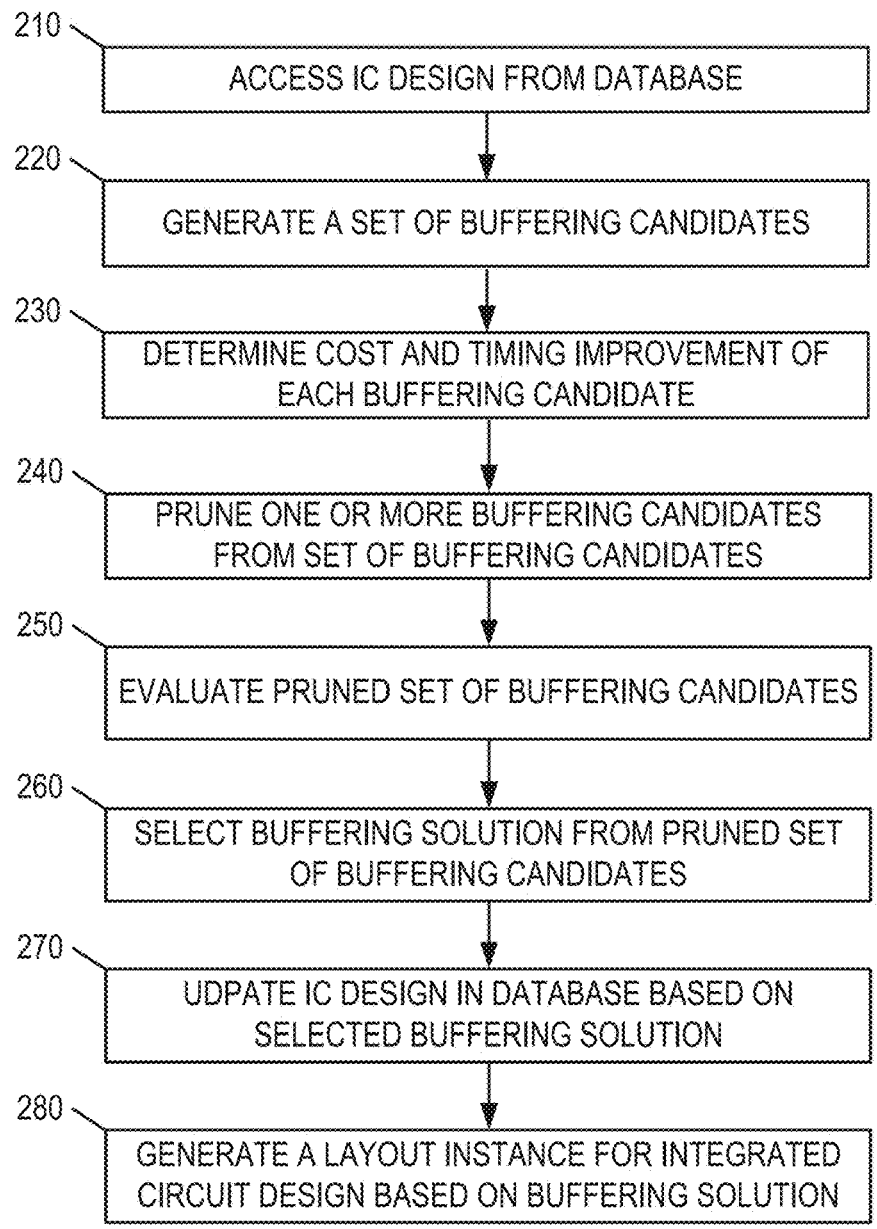
FIGS. 2 and 3 are flowcharts illustrating operations of a method for buffering that includes pruning buffering candidates in an IC design, according to some embodiments.
Figure 3:
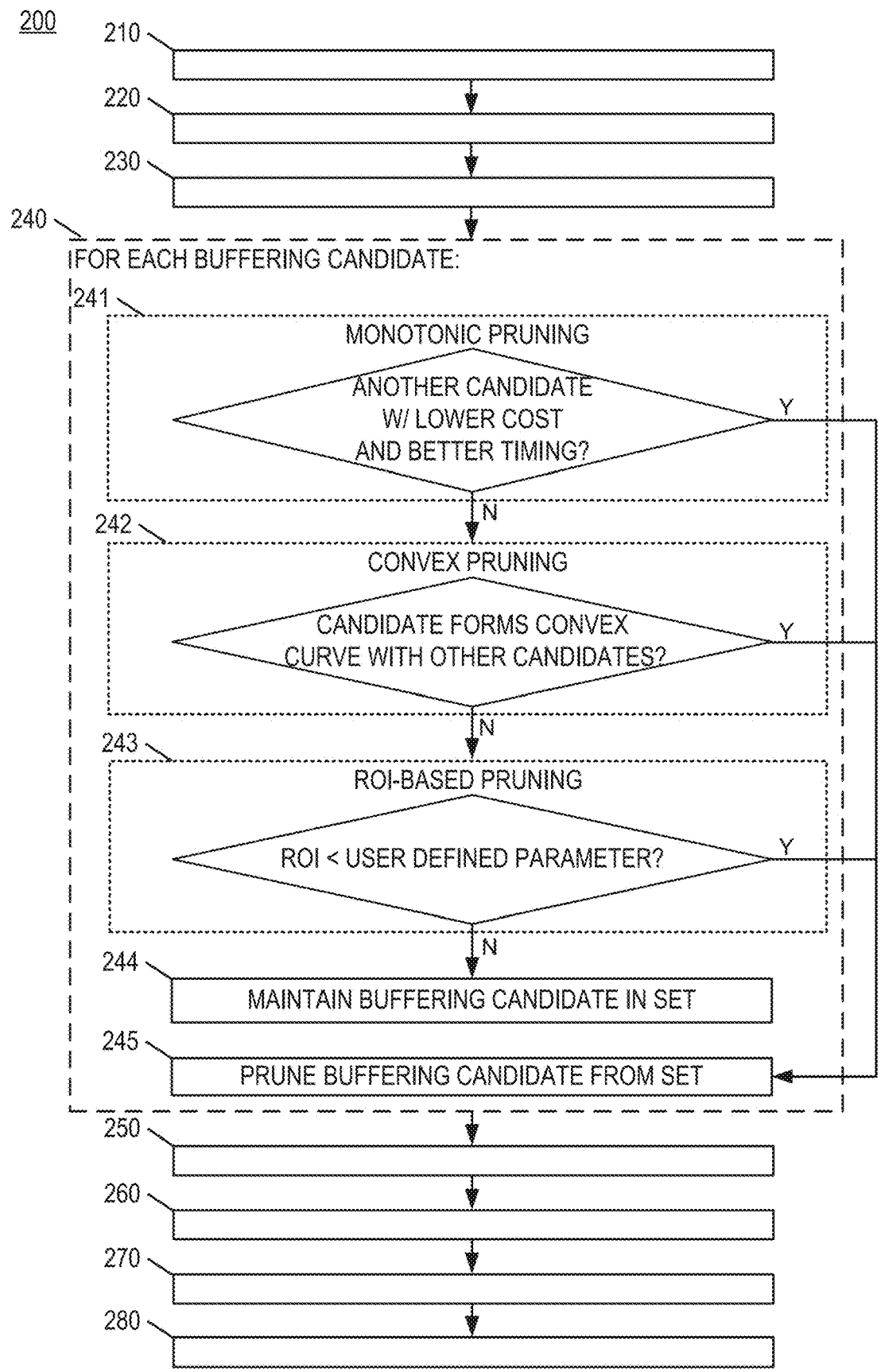

FIGS. 2 and 3 are flowcharts illustrating operations of a method 200 for cost-based pruning of buffering solutions an IC design, according to some embodiments. For some embodiments, the method 200 is performed as part of a place and route process applied to a circuit design (e.g., by an EDA system).

It will be understood that the method 200 may be performed by a computing device, such as a computing device executing instructions of an EDA system. For example, the operations of a method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below in reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

At operation 210, the computing device accesses, from a database in memory, an IC design comprising a net that includes a route connecting a source to a sink. The IC design can further specify bufferable locations along the route that connects the sink to the source.

The computing device, at operation 220, generates a set of buffering candidates for buffering the net. The computing device can generate a buffering candidate by inserting one or more buffer (or inverter) cells at one or more bufferable locations along the route that connects the sink to the source. Each buffering candidate comprises a buffer tree for the net. For example, the EDA system may utilize one or more cell libraries that provide multiple cell types including multiple buffer and inverter cell types to generate the buffering candidates. Buffering candidates may be generated by inserting various cell types at each bufferable location. Each buffering candidate indicates a particular bufferable location along with a buffer or inverter of a particular type inserted at the bufferable location.

At operation 230, the computing device determines a cost and timing improvement for each buffering candidate in the set of buffering candidates. The computing device can determine the cost associated with a buffering candidate based on an area consumed by cells in the buffering candidate, leakage current associated with the buffer (or inverter) cells in the initial buffer tree, and a total dynamic power of the buffering candidate. As an example, the computing device can determine the cost associated with a buffering candidate as follows:

$$\text{Cost} = A * \left( \frac{\text{Area}}{\frac{\text{Unit}}{\text{Area}}} \right) + B * \left( \frac{\text{leakage current}}{\text{unit current}} \right) + C * \left( \text{Dynamic} \frac{\text{Power}}{\text{unit power}} \right)$$

Where A, B, and C are configurable parameters. In some embodiments, the computing device can use a total capacitance of the buffering candidate as the dynamic power.

In determining the timing improvement of buffering candidates at operation 230, the computing device can utilize a first timing model to quickly estimate the timing of buffering candidates, The computing device determines the timing improvement of a buffering candidate based on an improvement to one or more timing characteristics (e.g., worst negative slack (WNS), total negative slack (TNS), slew, or skew) of the net realized by the buffering candidate. That is, the computing device can compare a timing characteristic value of the buffering candidate (determined using the first timing model) with a baseline timing characteristic value associated with the unbuffered net (also determined used the first timing model) to determine the timing improvement (e.g., based on a difference between the values).

The computing device prunes one or more of the buffering candidates, at operation 240, from the set of buffering candidates before evaluating the (pruned) set of buffering candidates, at operation 250, using a second timing model. That is, the computing device removes one or more buffering candidates from the set prior to evaluating the set, thereby reducing the number of buffering candidates to be evaluated using the second timing model. The pruning of the one or more buffering candidates results in a pruned set of buffering candidates that excludes the one or more buffering candidates pruned from the set.

The computing device can prune a buffering candidate from the set of buffering candidates based on the cost of the buffering candidate, the timing improvement provided by the buffering candidate, or a combination of both. For example, the computing device can perform: monotonic pruning in which a buffering candidate is pruned if there is at least one other candidate in the set with a smaller cost and greater timing improvement; convex pruning in which a buffering candidate is pruned if the candidate does not form a convex curve with a smaller-cost candidate and a larger-cost candidate; and ROI-based pruning in which a candidate is pruned if an ROI associated with the candidate is less than a user-defined parameter that establishes a minimum ROI for buffering candidates.

As noted above, in evaluating a buffering candidate from the pruned set of buffering solutions (at operation 250), the computing device uses a second timing model to determine a timing improvement for the buffering candidate, which is used to accurately determine the timing improvement rather than the estimation of the timing improvement determined using the first timing model. While the second timing model can provide more accurate results than the first timing model, the second timing model requires more computational overhead and run-time than the first timing model. Hence, the first timing model is used to quickly assess whether a buffering candidate should be pruned prior to engaging in a more robust and time-consuming evaluation using the second timing model.

The evaluating of a buffering candidate further includes determining an ROI value for the candidate. The computing device determines an ROI value associated with a buffering candidate based on a ratio between a difference in the timing improvement (determined using the second timing model) between the buffering candidate and a buffering candidate with lower cost, and the a difference between costs associated with the buffering candidate and the lower cost buffering candidate. For example, the computing device can determine an ROI value for a buffering candidate as follows:

$$ROI = \frac{\Delta \text{Timing Improvement}}{\Delta \text{Cost}}$$

The computing device selects, at operation 260, a buffering solution for the net from the set of buffering candidates based on the evaluation of the set of pruning candidates using the second timing model. That is, the computing device selects one of the buffering candidates as the buffering solution for the net based on ROI values determined for the pruned set of buffering candidates using the second timing model. In an example, the computing device can select the buffering candidate with the greatest ROI value as the buffering solution for the net.

The computing device updates the database based on the selected rebuffering solution, at operation 270. In doing so, the computing device updates the database to include an initial buffer tree for the net in the IC design. The computing device, at operation 280, generates a design layout instance for the IC device design based in part on selected rebuffering solution for the net. The layout describes the physical layout dimensions of the IC device.

As shown in FIG. 3, the method 200 can include operations 241-245, consistent with some embodiments. Consistent with these embodiments, the operations 241-245 can be performed as part of operation 240 (e.g., as a sub-routine, or sub-tasks) where the computing device prunes one or more buffering candidates from the set of buffering candidates. As shown, the operations 241-245 can be performed for each buffering candidate in the set of buffering candidates.

At operation 241, the computing device performs monotonic pruning. In performing the monotonic pruning, the computing device determines whether there is at least one other buffering candidate in the set with a lower cost and greater timing improvement. If there is another buffering candidate in the set with a lower cost and greater timing improvement, the computing device prunes the buffering candidate from the set of buffering candidates (operation 245).

If there is not another buffering candidate in the set with a lower cost and greater timing improvement, the method proceeds to operation 242 where the computing device performs convex pruning. In performing the convex pruning, the computing device determines whether the buffering candidate, when plotted on a graph representing a relationship between cost and timing improvement, forms a convex curve with a second buffering candidate with a lower cost (also referred to as a "lower-cost buffering candidate") and a third buffering candidate with a higher cost (also referred to as "higher-cost buffering candidate"). If the buffering candidate does not form a convex curve in this manner, the computing device prunes the buffering candidate from the set of buffering candidates (operation 245).

At operation 243, the computing device performs ROI-based pruning. In performing the ROI-based pruning, the computing device determines an ROI for the buffering candidate in the manner described above using a timing improvement value determined using the first timing model, and compares the ROI to a user defined parameter that defines a minimum ROI threshold. If the ROI is less than the minimum ROI threshold defined by the user parameter, the computing device prunes the buffering candidate from the set of buffering candidates (operation 245).

If the ROI is not less than the minimum ROI threshold defined by the user parameter, the computing device maintains the buffering candidate in the set of buffering candidates, at operation 244, and the buffering candidate is evaluated along with other buffering candidates in the set using the second timing model (at operation 250).

Figure 4:
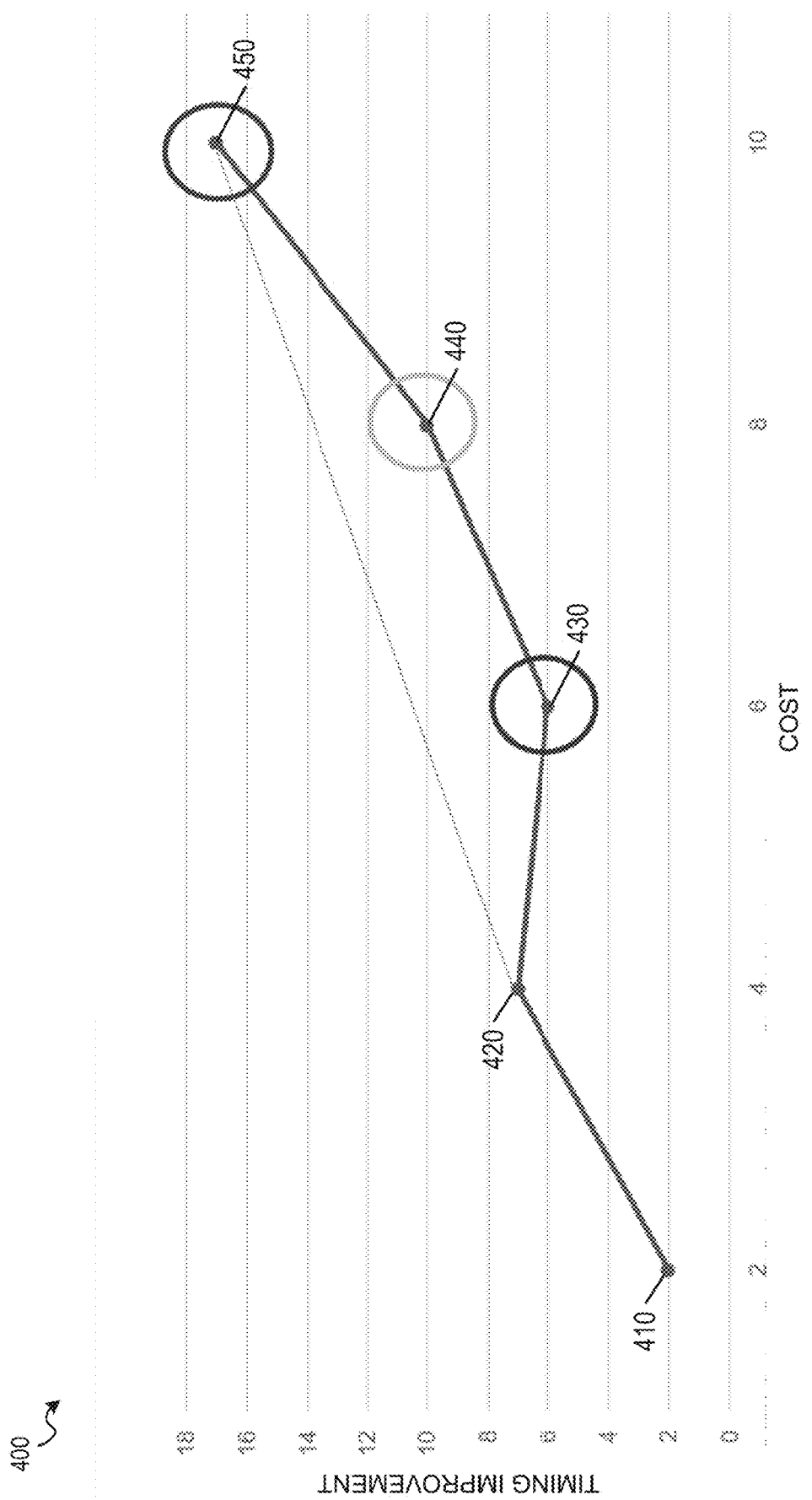
FIG. 4. is a graph illustrating an example buffering candidate pruning in an IC design, according to some embodiments.

FIG. 4. is a graph 400 illustrating an example of buffering candidate pruning, according to some embodiments. More specifically, the graph 400 illustrates examples of monotonic pruning, convex pruning, and ROI-based pruning. The graph 400 represents a relationship between cost and timing improvement values for a set of buffering candidates. The set of buffering candidates includes buffering candidates 410, 420, 430, 440, and 450.

In this example, the buffering candidate 430 can be pruned from the set of buffering candidates through monotonic pruning. That is, the buffering candidate 430 can be pruned because the buffering candidate 420 has both a lower cost (4<6) and a higher timing improvement value (7>6) than the buffering candidate 430.

The buffering candidate 440 can be pruned from the set of buffering candidates through convex pruning. For example, as shown, the buffering candidate 440 can be pruned because it does not form a convex curve with buffering candidate 420 (a lower-cost buffering candidate relative to buffering candidate 440) and buffering candidate 450 (a higher-cost buffering candidate relative to the buffering candidate 440).

Assuming an example minimum ROI threshold of 2 (established by a user defined parameter), the buffering candidate 450 can be pruned from the set of buffering candidates through ROI-based pruning. For example, given the cost of 10 and timing improvement value of 17 for candidate 450 and the cost of 4 and timing improvement of 7 for the candidate with the smaller cost (candidate 420), the ROI associated with buffering candidate 450 is 1.67 ((17−7)/(10−4)), which is less than 2.

Figure 5:
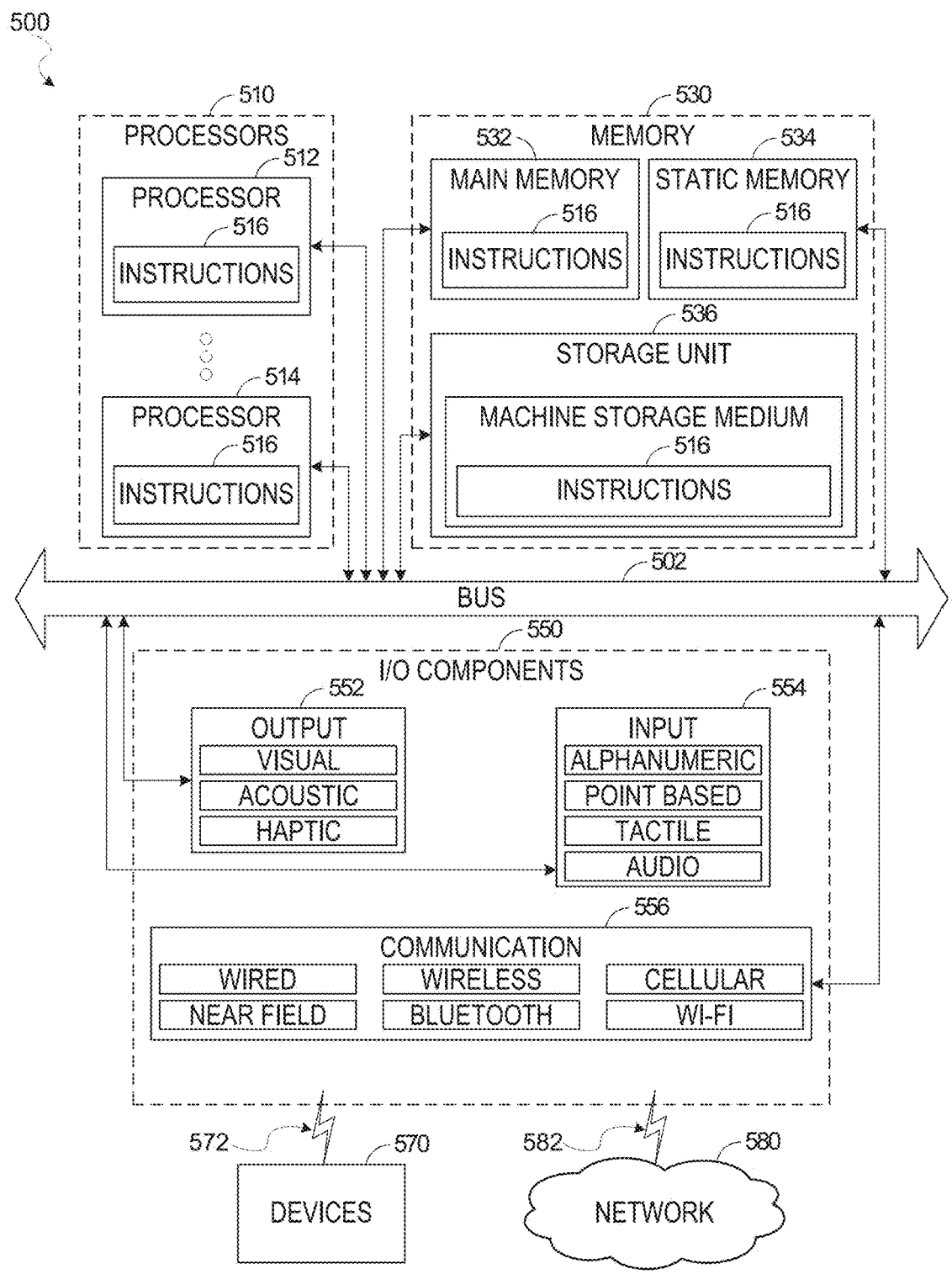
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may correspond to EDA software that transforms the machine 500 into an EDA system that executes the method 200. Additionally, or alternatively, the instructions 516 may implement FIGS. 1 and 5. The instructions 516 transform the general, non-programmed machine 500 into a particular machine 500, such as an EDA system, programmed to carry out the described and illustrated functions in the manner described here. In alternative embodiments, the machine 500 operates as a standalone device or may be coupled (e.g., networked) to other machines.

In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, both accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 556 operable to couple the machine 500 to a network 580 or devices 570 via a coupling 582 and a coupling 572, respectively. For example, the communication components 556 may include a network interface component or another suitable device to interface with the network 580. In further examples, the communication components 556 may include wired communication components, wireless communication components, cellular communication components, and other communication components to provide communication via other modalities. The devices 570 may be another machine or any of a wide variety of peripheral devices (e.g., a peripheral device coupled via a universal serial bus (USB)).

The various memories (e.g., 530, 532, 534, and/or memory of the processor(s) 510) and/or the storage unit 536 may store one or more sets of instructions and data structures (e.g., software) embodying or utilized by any one or more of the methodologies or functions described herein. These instructions, when executed by the processor(s) 510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks, and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 556) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. An electronic design automation (EDA) system comprising:
    one or more processors of a machine; and
    a computer-storage medium storing instructions, which when executed by the machine, cause the machine to perform operations comprising:
        accessing an integrated circuit (IC) design comprising a net that includes a route connecting a source to a sink;
        generating a set of buffering candidates for buffering the net;
        determining a timing improvement associated with a buffering candidate in the set of buffering candidates using a first timing model;
        pruning the buffering candidate from the set of buffering candidates based on the timing improvement and a cost associated with the buffering candidate, the pruning of the buffering candidate resulting in a pruned set of buffering candidates;
        evaluating the pruned set of buffering candidates using a second timing model;
        selecting a buffering solution for the net from the pruned set of buffering candidates based on a result of the evaluating; and
        updating the IC design to include the buffering solution selected for the net.

2. The EDA system of claim 1, wherein the pruning of the buffering candidate comprises one or more of:
    performing monotonic pruning;
    performing convex pruning; and
    performing return-on-investment (ROI) based pruning.

3. The EDA system of claim 1, wherein the pruning of the buffering candidate comprises:
    determining that at least one other buffering candidate in the set of buffering candidates has a lower cost and higher timing improvement value than the buffering candidate.

4. The EDA system of claim 1, wherein the pruning of the buffering candidate comprises:
  determining that the buffering candidate, when plotted on a graph representing a relationship between cost and timing improvement values among the set of buffering candidates, does not form a convex curve with a lower-cost buffering candidate and a higher-cost buffering candidate.

5. The EDA system of claim 1, wherein the pruning of the buffering candidate comprises:
  determining a return-on-investment (ROI) associated with the buffering candidate based on the timing improvement and the cost associated with the buffering candidate; and
  comparing the ROI associated with the buffering candidate with a minimum ROI threshold established by a user defined parameter.

6. The EDA system of claim 5, wherein determining the ROI associated with the buffering candidate comprises:
  dividing the timing improvement of the buffering candidate with the cost associated with the buffering candidate.

7. The EDA system of claim 1, wherein:
  the buffering candidate is a first buffering candidate in the set of buffering candidates; and
  evaluating the pruned set of buffering candidates using a second timing model comprises:
  determining a return-on-investment (ROI) associated with a second buffering candidate in the pruned set of buffering candidates based on a timing improvement determined using the second timing model.

8. The EDA system of claim 7, wherein the selecting of the buffering solution comprises selecting the second buffering candidate based on the ROI associated with the second buffering candidate.

9. The EDA system of claim 1, wherein:
  the buffering candidate is a first buffering candidate in the set of buffering candidates; and
  the operations further comprise:
  determining no other buffering candidate in the set of buffering candidates has a lower cost and higher timing improvement value than a second buffering candidate;
  determining that the second buffering candidate, when plotted on a graph representing a relationship between cost and timing improvement values among the set of buffering candidates, forms a convex curve with a lower-cost buffering candidate and a higher-cost buffering candidate;
  determining a return-on-investment (ROI) associated with the second buffering candidate based on a timing improvement determined using the first timing model;
  determining the ROI associated with the second buffering candidate is not less than a minimum ROI threshold; and
  maintaining the second buffering candidate in the pruned set of buffering candidates.

10. A method for electronic design automation, the method comprising:
  accessing, from a database in memory, an integrated circuit (IC) design comprising a net that includes a route connecting a source to a sink;
  generating a set of buffering candidates for buffering the net;
  determining a timing improvement associated with a buffering candidate in the set of buffering candidates using a first timing model;
  removing the buffering candidate from the set of buffering candidates based on the timing improvement and a cost associated with the buffering candidate, the removing of the buffering candidate resulting in a pruned set of buffering candidates;
  evaluating the pruned set of buffering candidates using a second timing model;
  selecting a buffering solution for the net from the pruned set of buffering candidates based on a result of the evaluating;
  updating the IC design in the database to include the buffering solution selected for the net; and
  generating a layout instance for the IC design based on the buffering solution.

11. The method of claim 10, wherein the pruning of the buffering candidate comprises one or more of:
  performing monotonic pruning;
  performing convex pruning; and
  performing return-on-investment (ROI) based pruning.

12. The method of claim 10, wherein the removing of the buffering candidate from the set of buffering candidates comprises:
  determining at least one other buffering candidate in the set of buffering candidates has a lower cost and higher timing improvement value than the buffering candidate.

13. The method of claim 10, wherein the removing of the buffering candidate from the set of buffering candidates comprises:
  determining that the buffering candidate, when plotted on a graph representing a relationship between cost and timing improvement values among the set of buffering candidates, does not form a convex curve with a lower-cost buffering candidate and a higher-cost buffering candidate.

14. The method of claim 10, wherein the removing of the buffering candidate from the set of buffering candidates comprises:
  determining a return-on-investment (ROI) associated with the buffering candidate based on the timing improvement and the cost associated with the buffering candidate; and
  comparing the ROI associated with the buffering candidate with a minimum ROI threshold established by a user defined parameter.

15. The method of claim 14, wherein determining the ROI associated with the buffering candidate comprises:
  dividing the timing improvement of the buffering candidate with the cost associated with the buffering candidate.

16. The method of claim 10, wherein:
  the buffering candidate is a first buffering candidate in the set of buffering candidates; and
  evaluating the pruned set of buffering candidates using a second timing model comprises:
  determining a return-on-investment (ROI) associated with a second buffering candidate in the pruned set of buffering candidates based on a timing improvement determined using the second timing model.

17. The method of claim 16, wherein the selecting of the buffering solution comprises selecting the second buffering candidate based on the ROI associated with the second buffering candidate.

18. The method of claim 10, wherein:
  the buffering candidate is a first buffering candidate in the set of buffering candidates; and the method further comprises:

determining no other buffering candidate in the set of buffering candidates has a lower cost and higher timing improvement value than a second buffering candidate;

determining that the second buffering candidate, when plotted on a graph representing a relationship between cost and timing improvement values among the set of buffering candidates, forms a convex curve with a lower-cost buffering candidate and a higher-cost buffering candidate;

determining a return-on-investment (ROI) associated with the second buffering candidate based on a timing improvement determined using the first timing model;

determining the ROI associated with the second buffering candidate is not less than a minimum ROI threshold; and maintaining the second buffering candidate in the pruned set of buffering candidates.

19. A computer-storage medium storing instructions, which when executed by a machine, cause the machine to perform operations comprising:

accessing an integrated circuit (IC) design comprising a net that includes a route connecting a source to a sink;

generating a set of buffering candidates for buffering the net;

determining a timing improvement associated with a buffering candidate in the set of buffering candidates using a first timing model;

determining a cost associated with the buffering candidate;

pruning the buffering candidate from the set of buffering candidates based on the timing improvement and the cost associated with the buffering candidate, the pruning of the buffering candidate resulting in a pruned set of buffering candidates;

evaluating the pruned set of buffering candidates using a second timing model, the evaluating of the pruned set of buffering candidate comprising determining a return-on-investment (ROI) associated with each buffering candidate;

selecting a buffering solution for the net from the pruned set of buffering candidates based on the ROI associated with each buffering candidate; and updating the IC design to include the buffering solution selected for the net.

20. The computer-storage medium of claim 19, wherein the pruning of the buffering candidate comprises one or more of:

determining at least one other buffering candidate in the set of buffering candidates has a lower cost and higher timing improvement value than the buffering candidate;

determining that the buffering candidate, when plotted on a graph representing a relationship between cost and timing improvement values among the set of buffering candidates, does not form a convex curve with a lower-cost buffering candidate and a higher-cost buffering candidate; and determining a ratio of the timing improvement to the cost associated with the buffering candidate does is less than a threshold value established by a user-defined parameter.

\* \* \* \* \*